US011071151B2

(12) United States Patent
Su et al.

(10) Patent No.: US 11,071,151 B2
(45) Date of Patent: Jul. 20, 2021

(54) METHODS AND APPARATUSES FOR CONNECTING A WIRELESS ACCESS POINT THROUGH AN APPLICATION IN A USER EQUIPMENT

(71) Applicant: SHANGHAI ZHANGMEN SCIENCE AND TECHNOLOGY CO., LTD., Shanghai (CN)

(72) Inventors: Yong Su, Shanghai (CN); Fei Wang, Shanghai (CN)

(73) Assignee: SHANGHAI ZHANGMEN SCIENCE AND TECHNOLOGY CO., LTD., Shanghai (CN)

(*) Notice: Subject to any disclaimer, the term of this patent is extended or adjusted under 35 U.S.C. 154(b) by 79 days.

(21) Appl. No.: 16/454,094

(22) Filed: Jun. 27, 2019

(65) Prior Publication Data
US 2019/0320473 A1 Oct. 17, 2019

Related U.S. Application Data

(63) Continuation of application No. PCT/CN2017/119292, filed on Dec. 28, 2017.

(30) Foreign Application Priority Data

Dec. 28, 2016 (CN) .......................... 201611238921.7
Mar. 9, 2017 (CN) .......................... 201710138460.4

(51) Int. Cl.
*H04W 76/10* (2018.01)
*H04W 48/16* (2009.01)
(Continued)

(52) U.S. Cl.
CPC ........... *H04W 76/10* (2018.02); *H04W 48/16* (2013.01); *H04W 48/20* (2013.01); *G06F 8/31* (2013.01); *H04L 69/329* (2013.01); *H04W 80/10* (2013.01)

(58) Field of Classification Search
CPC ..... H04W 76/10; H04W 48/16; H04W 48/20; H04W 12/06; H04W 12/003; H04W 4/60; H04W 80/10
See application file for complete search history.

(56) References Cited

U.S. PATENT DOCUMENTS 10,117,158 B2 * 10/2018 De Foy ................. H04W 76/00
2015/0113432 A1 4/2015 Jung et al.
(Continued)

FOREIGN PATENT DOCUMENTS

CN 101207924 A 6/2008
CN 101647701 A 2/2010
(Continued)

*Primary Examiner* — Hassan Kizou
*Assistant Examiner* — Hector Reyes
(74) *Attorney, Agent, or Firm* — Kilpatrick Townsend & Stockton, LLP

(57) ABSTRACT

The object of the present application is to provide a method for connecting a wireless access point through an application in a user equipment, comprising: obtaining a first wireless connection request regarding a target wireless access point; sending a second wireless connection request regarding the target wireless access point to a corresponding second application, wherein the second application and the first application are installed in the same user equipment; and receiving connection result information of the second application regarding the second wireless connection request. The present application may improve development efficiency and shorten the development process, decreasing development costs and improving the user experience.

12 Claims, 5 Drawing Sheets

(51) Int. Cl.
*H04W 48/20* (2009.01)
*G06F 8/30* (2018.01)
*H04L 29/08* (2006.01)
*H04W 80/10* (2009.01)

(56) References Cited

U.S. PATENT DOCUMENTS

| | | | |
|---|---|---|---|
| 2015/0237197 A1* | 8/2015 | Kuehnel | H04W 88/02 370/311 |
| 2015/0350910 A1 | 12/2015 | Eramian | |
| 2018/0109948 A1* | 4/2018 | Huber | H04W 12/0608 |
| 2018/0115946 A1* | 4/2018 | Baltar | H04W 76/18 |
| 2018/0184247 A1* | 6/2018 | Zhang | H04L 41/0681 |
| 2018/0302852 A1* | 10/2018 | Liang | H04W 36/0022 |

FOREIGN PATENT DOCUMENTS

| | | |
|---|---|---|
| CN | 104317573 A | 1/2015 |
| CN | 105611525 A | 5/2016 |
| CN | 105873239 A | 8/2016 |
| CN | 106941709 A | 7/2017 |

* cited by examiner

METHODS AND APPARATUSES FOR CONNECTING A WIRELESS ACCESS POINT THROUGH AN APPLICATION IN A USER EQUIPMENT

CROSS REFERENCE TO RELATED APPLICATIONS

This application is the Continuation Application of International Application PCT/CN2017/119292, filed on Dec. 28, 2017, which is based upon and claims priority to Chinese Patent Application No. 201611238921.7, filed on Dec. 28, 2016 and Chinese Patent Application No. 201710138460.4, filed on Mar. 9, 2017, the entire contents of which are incorporated herein by reference.

TECHNICAL FIELD

The application relates to the technical field of communication, particularly to methods and apparatuses for connecting a wireless access point through an application in a user equipment.

BACKGROUND

At present, WiFi applications on market can be classified into Android applications and IOS applications, both of which require knowledge of the APIs related to WiFi of the native system and coding of interfaces and functions. The developed code on the two platforms cannot be compatible and thus leads to poor portability. Each upgrade of functions of applications require release of a new version to be downloaded by users, which has a high cost and a long period. In addition, the cost of maintaining multiple versions of applications based on native system is quite massive.

CONTENTS OF THE INVENTION

The object of the present application is to provide methods and devices for connecting a wireless access point through an application in a user equipment.

According to an aspect of the present application, it is provided a method for connecting a wireless access point through a first application in a user equipment, the method comprising:
  obtaining a first wireless connection request regarding a target wireless access point;
  sending a second wireless connection request regarding the target wireless access point to a corresponding second application by invoking a first interface provided by the second application, wherein the second application and the first application are installed in the same user equipment as the first application, the first interface is independent from the system of the user equipment, the second application, based on the second wireless connection request, invoke a wireless connection interface of the system to establish a wireless connection between the user equipment and the target wireless access point.

According to another aspect of the present application, it is provided a method for connecting a wireless access point through a second application in a user equipment, the method comprising:
  receiving a second wireless connection request regarding a target wireless access point sent from a first application to the second application by invoking a first interface provided by the second application, wherein the second application and the first application are installed in the same user equipment, the first interface is independent from the system of the user equipment;
  establishing wireless connection between the user equipment and the target wireless access point by invoking a wireless connection interface of the system;
  returning connection result information corresponding to the second wireless connection request to the first application.

According to a further aspect of the present application, it is provided a method of connecting a wireless access point through a first application in a user equipment, the method comprising:
  obtaining a first wireless connection request regarding a target wireless access point;
  sending a second wireless connection request regarding the target wireless access point to a corresponding second application, wherein the second application and the first application are installed in the same user equipment;
  receiving connection result information of the second application regarding the second wireless connection request.

According to a further aspect of the present application, it is provided a method of connecting a wireless access point through a second application in a user equipment, the method comprising:
  receiving a second wireless connection request regarding a target wireless access point sent from the first application to the second application, wherein the second application and the first application are installed in the same user equipment;
  establishing a wireless connection between the user equipment and the target wireless access point by invoking the system wireless connection interface of the user equipment;
  returning connection result information corresponding to the second wireless connection request to the first application.

According to an aspect of the present application, it is provided a first apparatus for connecting a wireless access point through a first application in a user equipment, the first apparatus comprising:
  a one-one module, configured to obtain a first wireless connection request regarding a target wireless access point;
  a one-two module, configured to send a second wireless connection request regarding the target wireless access point to a corresponding second application by invoking a first interface provided by the second application, wherein the second application and the first application are installed in the same user equipment, the first interface is independent from the system of the user equipment, the second application invoke a wireless connection interface of the system to establish a wireless connection between the user equipment and the target wireless access point based on the second wireless connection request.

According to another aspect of the present application, it is provided a second apparatus for connecting a wireless access point through a second application in a user equipment, the second apparatus comprising:
  a two-one module, configured to receive a second wireless connection request regarding a target wireless access point sent from a first application to the second application by invoking a first interface provided by the second application, wherein the second application and the first application are installed in the same user equipment, the first interface is independent from the system of the user equipment;

a two-two module, configured to establish a wireless connection between the user equipment and the target wireless access point by invoking a wireless connection interface of the system;

a two-three module, configured to return connection result information corresponding to the second wireless connection request to the first application.

According to a further aspect of the present application, it is provided a first apparatus for connecting a wireless access point through a first application in a user equipment, the first apparatus comprising:

a three-one module, configured to obtain a first wireless connection request regarding a target wireless access point;

a three-two module, configured to send a second wireless connection request regarding the target wireless access point to a corresponding second application, wherein the second application and the first application are installed in the same user equipment;

a three-three module, configured to receive connection result information of the second application regarding the second wireless connection request.

According to a further aspect of the present application, it is provided a second apparatus for connecting a wireless access point through a second application in a user equipment, the second apparatus comprising:

a four-one module, configured to receive a second wireless connection request regarding a target wireless access point sent from the first application to the second application, wherein the second application and the first application are installed in the same user equipment;

a four-two module, configured to establish a wireless connection between the user equipment and the target wireless access point by invoking the system wireless connection interface of the user equipment;

a four-three module, configured to return connection result information corresponding to the second wireless connection request to the first application.

According to an aspect of the present application, it is provided a first device for connecting a wireless access point through a first application in a user equipment, the first device comprising:

a processor; and a memory configured to store computer executable instructions, when executed, cause the processor to:

obtain a first wireless connection request regarding a target wireless access point;

send a second wireless connection request regarding the target wireless access point to a corresponding second application by invoking a first interface provided by the second application, wherein the second application and the first application are installed in the same user equipment, the first interface is independent from the system of the user equipment;

receive connection result information of the second application regarding the second wireless connection request.

According to another aspect of the present application, it is provided a second device for connecting a wireless access point through a second application in a user equipment, the second device comprising:

a processor; and a memory configured to store computer executable instructions, when executed, cause the processor to:

receive a second wireless connection request regarding a target wireless access point sent from a first application to the second application by invoking a first interface provided by the second application, wherein the second application and the first application are installed in the same user equipment, the first interface is independent from the system of the user equipment;

establish a wireless connection between the user equipment and the target wireless access point by invoking a wireless connection interface of the system;

return connection result information corresponding to the second wireless connection request to the first application.

According to a further aspect of the present application, it is provided a first device for connecting a wireless access point through a first application in a user equipment, the first device comprising:

a processor; and a memory configured to store computer executable instructions, when executed, cause the processor to:

obtain a first wireless connection request regarding a target wireless access point;

send a second wireless connection request regarding the target wireless access point to a corresponding second application, wherein the second application and the first application are installed in the same user equipment;

receive connection result information of the second application on the second wireless connection request.

According to a further aspect of the present application, it is provided a second device for connecting a wireless access point through a second application in a user equipment, the second device comprising:

a processor; and a memory configured to store computer executable instructions, when executed, cause the processor to:

receive a second wireless connection request regarding a target wireless access point sent from a first application to the second application, wherein the second application and the first application are installed in the same user equipment;

establish a wireless connection between the user equipment and the target wireless access point by invoking the system wireless connection interface of the user equipment;

return connection result information corresponding to the second wireless connection request to the first application.

According to an aspect of the present application, it is provided a computer readable storage medium including instructions, when executed, cause a system to:

obtain a first wireless connection request regarding a target wireless access point;

send a second wireless connection request regarding the target wireless access point to a corresponding second application by invoking a first interface provided by the second application, wherein the second application and a first application are installed in a same user equipment, the first interface is independent from the system of the user equipment;

receive connection result information of the second application regarding the second wireless connection request.

According to another aspect of the present application, it is provided a computer readable storage medium including instructions, when executed, cause a system to:

receive a second wireless connection request regarding a target wireless access point sent from a first application to a second application by invoking a first interface provided by the second application, wherein the second application and the first application are installed in a same user equipment, the first interface is independent from the system of the user equipment;

establish a wireless connection between the user equipment and the target wireless access point by invoking a wireless connection interface of the system;

return connection result information corresponding to the second wireless connection request to the first application.

According to a further aspect of the present application, it is provided a computer readable storage medium including instructions, when executed, cause a system to:

obtain a first wireless connection request regarding a target wireless access point;

send a second wireless connection request regarding the target wireless access point to a corresponding second application, wherein the second application and a first application are installed in a same user equipment;

receive connection result information of the second application on the second wireless connection request.

According to a further aspect of the present application, it is provided a computer readable storage medium including instructions, when executed, cause a system to:

receive a second wireless connection request regarding a target wireless access point sent from a first application to a second application, wherein the second application and the first application are installed in a same user equipment;

establish a wireless connection between the user equipment and the target wireless access point by invoking the system wireless connection interface of the user equipment;

return connection result information corresponding to the second wireless connection request to the first application.

The present application has the following advantages compared with the prior art:

1) The developers are not required to code on different operating systems. Only one type of API is required. That is, applications which may run on different platforms may be developed, which improves the development efficiency, shortens the development period and reduces development costs;

2) Applications may be updated on-line without downloading of a new release of the applications. There is no need to inform the user of the updates and improves user experience. There is no need to maintain multiple versions of an application, which further reduces the development costs.

DESCRIPTIONS OF DRAWINGS

The other features, objectives and advantages of the present application will become more apparent by reading the following detailed description made with reference to the drawings for non-limiting embodiments:

Figure 1:
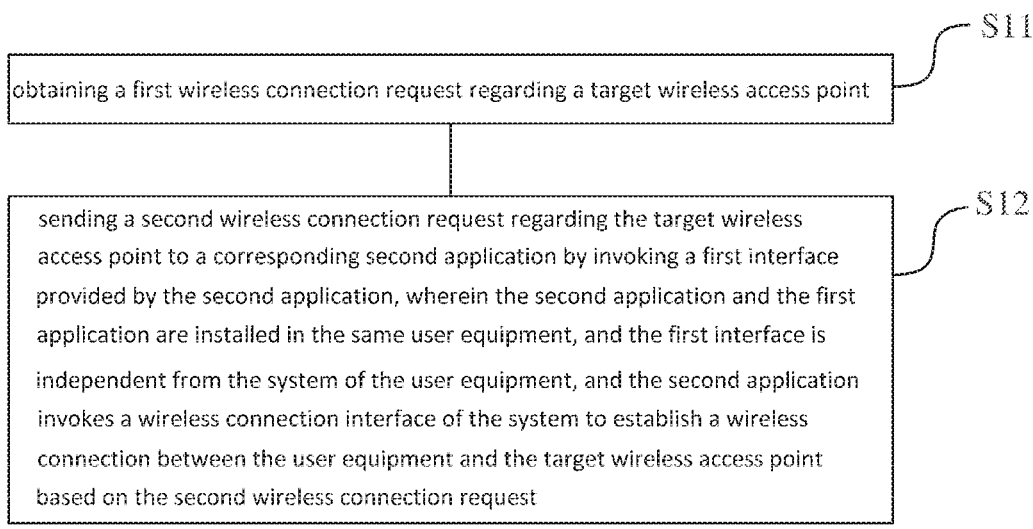
FIG. 1 shows a flowchart of a method for connecting a wireless access point through a first application in a user equipment according to an embodiment of the present application.

In the drawings, identical or similar reference signs represent identical or similar components.

DETAILED EMBODIMENTS

The present application is hereinafter further described in detail in conjunction with the accompanying drawings.

In a typical configuration of the present application, a terminal, a device of a service network and a trusted party all include one or more processors (CPUs), an input/output interface, a network interface and a memory.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable medium and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission medium, which can be used to store information that can be accessed by a computing device. According to the definition herein, the computer-readable medium does not include a non-transitory computer-readable medium, such as a modulated data signal and a carrier.

The device as referred to herein include but are not limited to a user equipment, a network device, or a device constituted by an integration of a user equipment and a network device through a network. The user equipment includes but is not limited to any type of mobile electronic product capable of communicate with human for interaction between human and machines (e.g., interact between human and machines through touchpad), such as intelligent phones, tablets, etc., and runs on any operating system, such as android operating system, iOS operating system, and the like. The network device includes an electronic device capable of automatically calculating digital values and processing information according to pre-set or stored instructions. The hardware of the network device include but are not limited to: microprocessors, application specific integrated circuits (ASIC), programmable logic devices (PLD), field programmable gate array (FPGA), digital signal processors (DSP), imbedded devices, etc. The network devices include but are not limited to: computers, mainframes, a single network server, a set of multiple network servers and a cloud formed by multiple servers. Cloud as used herein is formed by a massive amount of mainframes or multiple servers based on cloud computing, wherein cloud computing is a type of distributed computing, which is a virtual super computer composed of a group of loosely coupled computer sets. The network includes but is not limited internet, wide area networks, metropolitan area networks, local area networks, VPN, wireless adhoc network, etc. In one embodiment, the device can be a program running on the user equipment, the network device, or the user equipment and the network device, or a device composed of an integration of the network device, a touchable terminal or the network device and the touchable terminal through the network.

The apparatus as referred to herein include but are not limited to: a user equipment, a network apparatus, or apparatus composed of an integration of the user equipment and the network apparatus through a network. The user equipment includes but is not limited to any type of mobile electronic product capable of communicate with human for interaction between human and machines (e.g., interact between human and machines through touchpad), such as intelligent phones, tablets, etc., and runs on any operating system, such as android operating system, iOS operating system, and the like. The network apparatus includes an electronic apparatus capable of automatically calculating digital values and processing information according to pre-set or stored instructions. The hardware of the network apparatus includes but is not limited to: microprocessors, application specific integrated circuits (ASIC), programmable logic devices (PLD), field programmable gate array (FPGA), digital signal processors (DSP), imbedded apparatus, etc. The network apparatus includes but is not limited to: computers, mainframes, a single network server, a set of multiple network servers and a cloud formed by multiple servers. Cloud as used herein is formed by a massive amount of mainframes or multiple servers based on cloud computing, wherein cloud computing is a type of distributed computing, which is a virtual super computer composed of a group of loosely coupled computer sets. The network includes but is not limited internet, wide area networks, metropolitan area networks, local area networks, VPN, wireless adhoc network, etc. In one embodiment, the apparatus can be a program running on the user equipment, the network apparatus, or the user equipment and the network apparatus, or an apparatus composed of an integration of the network apparatus, a touchable terminal or the network apparatus and the touchable terminal through the network.

Those skilled in the art can appreciate that the above mentioned devices or apparatus are merely examples, and other existing devices or apparatus or devices or apparatus that would become available in the further can also apply to the present application and should be incorporated into the protection scope of the present application and are incorporated herein by reference.

In the present application, the term "multiple" means two or more, unless otherwise instructed.

The detailed description will follow using a first application, a second application on a user equipment used by a user as an example.

FIG. 1 shows a flowchart of a method for connecting a wireless access point through a first application in a user equipment according to an embodiment of the present application, wherein the method includes a step S11 and a step S12.

In step S11, the first application obtains a first wireless connection request regarding a target wireless access point. In step S12, the first application sends a second wireless connection request regarding the target wireless access point to a corresponding second application by invoking a first interface provided by the second application, wherein the second application and the first application are installed in a same user equipment, and the first interface is independent from the system of the user equipment. The second application, based on the second wireless connection request, invokes a wireless connection interface of the system to establish a wireless connection between the user equipment and the target wireless access point.

In particular, in step S11, the first application obtains a first wireless connection request regarding the target wireless access point. For example, the user desires to connect the user equipment to the target wireless access point by designating the SSID/BSSID of the target wireless access point and sending a first wireless connection request regarding the target wireless access point to the first application. The operation of designation can be implemented by manual input via the user equipment, or selection from the wireless access lists provided by the user equipment, etc.

Then in step S12, the first application sends a second wireless connection request regarding the target wireless access point to a corresponding second application by invoking a first interface provided by the second application, wherein the second application and the first application are installed in the same user equipment, and the first interface is independent from the system of the user equipment. The second application, based on the second wireless connection request, invokes a wireless connection interface of the system to establish a wireless connection between the user equipment and the target wireless access point. For example, the first application invokes a corresponding first interface provided by the second application to send a second wireless connection request regarding the target wireless access point, which corresponds to the first wireless connection request, to the second application, wherein the first application and the second application are both installed in the same user equipment. Accordingly, the invocation of the first interface happens at the user equipment. The first interface is independent from the operating system of the user equipment, so that the first interface is independent from the programming interface provided by the operating system of the user equipment. The invocation of the first interface by the first application is independent from the programming interface provided by the operating system of the user equipment, so that the developers of the first application merely have to focus on the interface provided by the second application to the first application regardless of specific development platform, rather than focusing on the system programming interface.

At this point, the second application invokes a wireless connection interface of the system to establish a wireless connection between the user equipment and the target wireless access point, wherein the wireless connection interface is provided by the system of the user equipment. By invoking the interface of the user equipment, a wireless connection between the user equipment and the target wireless access point can be implemented.

In one embodiment, in step S13, the first application receives connection result information of the second application regarding the second wireless connection request. For example, the first application receives information such as successful connection, failed connection, connection bandwidth information, connection stability information, etc. returned after sending the second wireless connection request. In one embodiment, communication is achieved via a wireless connection between the user equipment and the target wireless access point if the connection result information includes information of successful connection. At this point, since a wireless connection between the user equipment and the target wireless access point is established, the communication between the user equipment and the target wireless access point may be implemented without for the interface provided by the second application.

In one embodiment, the second application further provides a second interface independent from the system of the user equipment. A scanning request may be sent to the second application by invoking the second interface for scanning wireless access points (the signal of which can cover the user equipment) surrounding the user equipment, and one or more wireless access points may be obtained which are returned by the second application based on the scanning request, for example, SSID/BSSID information and/or wireless signal strength of the one or more wireless access points. Similar to the first interface, the second interface is independent from the operating system of the user equipment, so that the second interface is independent from the programming interface of the operating system of the user equipment. The invocation of the second interface by the first application is independent from the programming interface of the operating system of the user equipment, so that the developers of the first application merely have to focus on the interface provided by the second application to the first application regardless of the specific developing platform, rather than focusing on the system programming interface.

Figure 9:
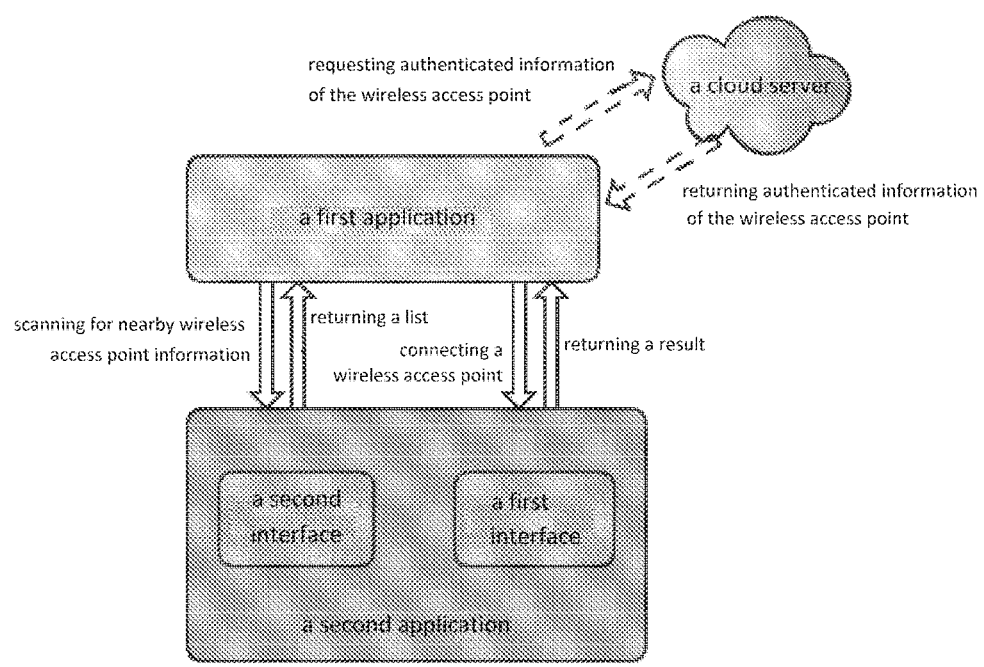
FIG. 9 shows a schematic diagram illustrating the relation among the first application, the second application and the cloud server according to an embodiment of the present application.

In one embodiment, in step S11, the first application obtains a first wireless connection request regarding the target wireless access point, wherein the target wireless access point is selected from the one or more wireless access points returned by the second application. The selection may be performed by the user, or by the first application according to pre-set logic (e.g., selecting the wireless access point with the strongest signal strength). Further, referring to FIG. 9, before selecting the target wireless access point from the one or more wireless access points, authenticated status information of these wireless access points may be requested from corresponding network devices (e.g., cloud servers). For example, cloud servers store in advance information of some wireless access points and corresponding authenticated status information, such as whether the wireless access point has corresponding authenticated information stored at the cloud server. Target wireless access point is selected from these one or more wireless access points according to the requested authenticated status information. For example, a wireless access point having corresponding authenticated information stored at the cloud server is selected as the target wireless access point from the multiple wireless access points, for connection in accordance with the authenticated information stored at the cloud server. A first wireless connection request is then obtained regarding the target wireless access point.

In one embodiment, to facilitate the user selecting the target wireless access point from the one or more wireless access points returned by the second application based on the scanning request sent by the first application via the second interface, presenting at least one wireless access point of the one or more wireless access points in the first application. For example, the wireless access points returned are all presented in a list on the screen of the user equipment. Or the wireless access points returned may be ranked (for example, according to the signal strength) and then be presented. Or only one or more qualified wireless access points that are filtered according to pre-set logic are presented. Then, a first wireless connection request regarding the target wireless access point may be generated according to the target wireless access point selected from the presented at least one wireless access point by the user.

In one embodiment, the second application further provides a third interface independent from the system of the user equipment. An execution request may be sent from the second application by invoking the third interface. The execution request includes but is not limited to: obtaining interface elements from the second application, such as view components, layouts, etc., obtaining the location information of the user equipment from the second application, performing data storage in the user equipment through the second application, performing data communication through the second application. Accordingly, the third interface provided by the second application includes but is not limited to: an interface for obtaining interface elements from the second application, an interface for obtaining location information of the user equipment from the second application, an interface for performing data storage in the user equipment through the second application, an interface for performing data communication through the second application. Similar to the first interface, the third interface is independent from the operating system of the user equipment, so that the third interface is independent from the programming interface of the operating system of the user equipment. The invocation of the third interface by the first application is also independent from the programming interface of the operating system of the user equipment, so that the developers of the first application merely have to focus on the interface provided by the second application to the first application regardless of the specific development platform, rather than focusing on the system programming interface.

Specifically, the first application is developed based on a script language (e.g., JavaScript, Lua, Python, Ruby, etc). The second application has a corresponding built-in script engine. The first application may be interpreted and executed by invoking the script engine. After the second application with identical script engine is developed on different platforms, the first application which is developed based on corresponding script language and has practical functions may run across different platforms. The developers do not have to code for different system platforms, but rather focus on the interface provided by the second application. Applications that can run on different platforms are thus developed, which improves the development efficiency, shortens the development period, and reduces the development costs. In addition, the functional updates of the first application can be implemented on-line without the need of downloading and installation of a new release of the application. There is no need to inform the user of the update, which improves user experience. Meanwhile, there is no need to maintain multiple versions of the first application and thus further reduces the development costs.

Figure 10:
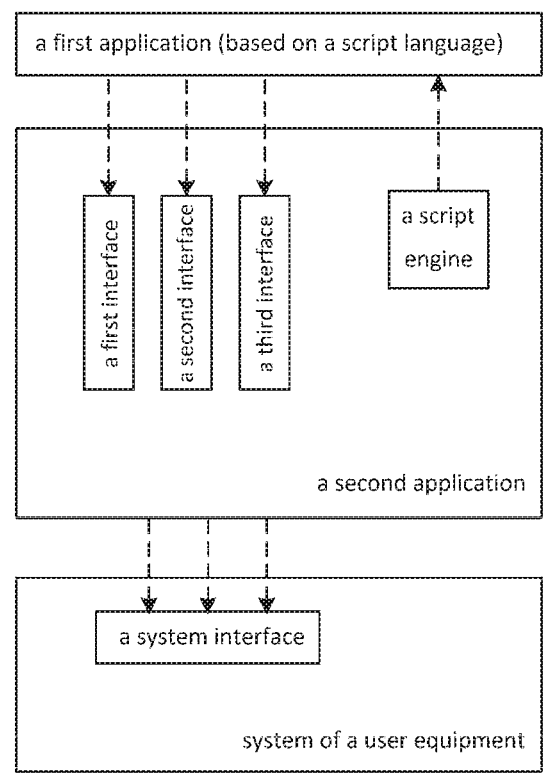
FIG. 10 shows a schematic diagram illustrating the principle of a system of the first application, the second application and the user equipment according to an embodiment of the present application.

Referring to FIG. 10, the first application is developed based on a script language. The second application has a built-in script engine. The first application may be interpreted and executed by invoking the script engine. The second application provides a first interface and a second interface independent from the system of the user equipment. By invoking the second interface, scanning request is sent to the second application for scanning wireless access points surrounding the user equipment (the signal of which cover the user equipment). The second application invokes the wireless connection point scanning interface of the system interface provided by the system of the user equipment to scan and obtain one or more wireless access points surrounding the user equipment, and the one or more wireless access points are returned to the second application. The second application then returns the one or more wireless access points based on the scanning request of the first application, for example, the SSID/BSSID information and/or wireless signal strength, etc. of the one or more wireless access points. The first application invokes the first interface provided by the second application to send a second wireless connection request regarding the target wireless access point and corresponding to the first wireless connection request to the second application. In one embodiment, the second application further provides a third interface independent from the system of the user equipment. The first application sends an execution request from the second application by invoking the third interface. The execution request includes but is not limited to: obtaining interface elements from the second application (e.g., view components, layouts, etc.), obtaining location information of the user equipment from the second application, performing data storage in the user equipment through the second application, performing data communication through the second application. Accordingly, the third interface provided by the second application includes but is not limited to: an interface for obtaining interface elements from the second application, an interface for obtaining location information of the user equipment from the second application, an interface for performing data storage in the user equipment through the second application, and an interface for performing data communication through the second application. Further, with further reference to FIG. 9, before selecting the target wireless access point, the first application obtains the authenticated information of these wireless access points from corresponding network devices (e.g., cloud servers). For example, the cloud servers store in advance information on some wireless access points and corresponding authenticated information. The target wireless access point is selected from these one or more wireless access points according to the authenticated information. Then a first wireless connection request is obtained regarding the target wireless access point.

The first application and the second application are both installed in the same user equipment. Accordingly, the invocation of the first interface happens at the user equipment. In addition, the first interface, the second interface and the third interface are independent from the operating system of the user equipment, so that the first interface, the second interface and the third interface are independent from the programming interface provided by the operating system of the user equipment. The invocation of the first interface by the first application is independent from the programming interface provided by the operating system of the user equipment, so that the developers of the first application merely have to focus on the interface provided by the second application to the first application regardless of the specific development platform, rather than focusing on the system programming interface.

Figure 2:
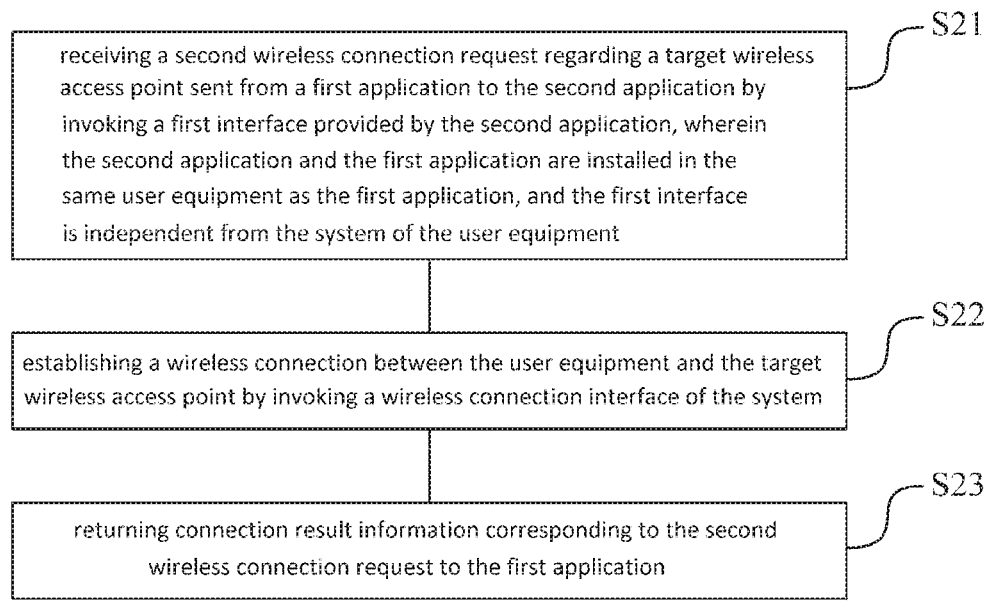
FIG. 2 shows a flowchart of a method for connecting a wireless access point through a second application in a user equipment according to another embodiment of the present application.

FIG. 2 shows a flowchart of a method for connecting a wireless access point through a second application in a user equipment according to another aspect of the present application, wherein the method includes step S21, step S22 and step S23.

In step S21, the second application receives a second wireless connection request regarding a target wireless access point sent from a first application to the second application by invoking a first interface provided by the second application, wherein the second application and the first application are installed in the same user equipment, and the first interface is independent from the system of the user equipment. In step S22, the second application establishes a wireless connection between the user equipment and the target wireless access point by invoking a wireless connection interface of the system. In step S23, the second application returns connection result information corresponding to the second wireless connection request to the first application.

In particular, in step S21, the second application receives a second wireless connection request regarding a target wireless access point sent from a first application to the second application by invoking a first interface provided by the second application, wherein the second application and the first application are installed in the same user equipment, and the first interface is independent from the system of the user equipment. For example, the first application invokes a corresponding first interface provided by the second application to send a second wireless connection request regarding the target wireless access point and corresponding to the first wireless connection to the second application. The first application and the second application are both installed in the same user equipment. Accordingly, the invocation of the first interface happens at the user equipment. In addition, the first interface is independent from the operating system of the user equipment, so that the first interface is independent from the programming interface of the operating system of the user equipment. The invocation of the first interface by the first application is also independent from the programming interface of the operating system of the user equipment, so that the developers of the first application merely have to focus on the interface provided by the second application to the first application regardless of the specific development platform, rather than focusing on the system programming interface.

In step S22, the second application establishes a wireless connection between the user equipment and the target wireless access point by invoking a wireless connection interface of the system. The wireless connection interface is provided by system of individual user equipment. A wireless connection between the user equipment and the target wireless access point is implemented by invoking the interface of the individual user equipment.

In step S23, the second application returns connection result information corresponding to the second wireless connection request to the first application. For example, the first application receives information such as successful connection, failed connection, connection bandwidth information, connection stability information, etc. returned after sending the second wireless connection request. In one embodiment, the second application communicates via a wireless connection between the user equipment and the target wireless access point if the connection result information includes information of successful connection. At this point, since a wireless connection between the user equipment and the wireless access point is established, the communication between the user equipment and the target wireless access point can be implemented without the interface provided by the second application.

In one embodiment, the second application further provides a second interface independent from the system of the user equipment. A scanning request may be sent to the second application by invoking the second interface by the first application for scanning wireless access points (the signal of which can cover the user equipment) surrounding the user equipment, and one or more wireless access points may be obtained which are returned by the second application based on the scanning request, for example, the SSID/BSSID information and/or wireless signal strength, etc. of the one or more wireless access points. Similar to the first interface, the second interface is independent from the operating system of the user equipment, so that the second interface is independent from the programming interface of the operating system of the user equipment. The invocation of the second interface by the first application is independent from the programming interface of the operating system of the user equipment, so that the developers of the first application merely have to focus on the interface provided by the second application to the first application regardless of the specific developing platform, rather than focusing on the system programming interface. At this point, a scan for wireless access points surrounding the user equipment (the signal of which cover the user equipment) is performed by invoking the wireless connection point scanning interface of the system of the user equipment, and one or more wireless access points are returned by the second application based on the scanning request. Then at least one wireless access point of the one or more wireless access points may be returned to the first application. For example, the wireless access points returned based on the scanning request may be ranked (for example, according to the signal strength) and then preferred wireless access points may be returned. Or at least one wireless access point of the one or more wireless access points may be filtered and returned according to other pre-set logic.

Figure 3:
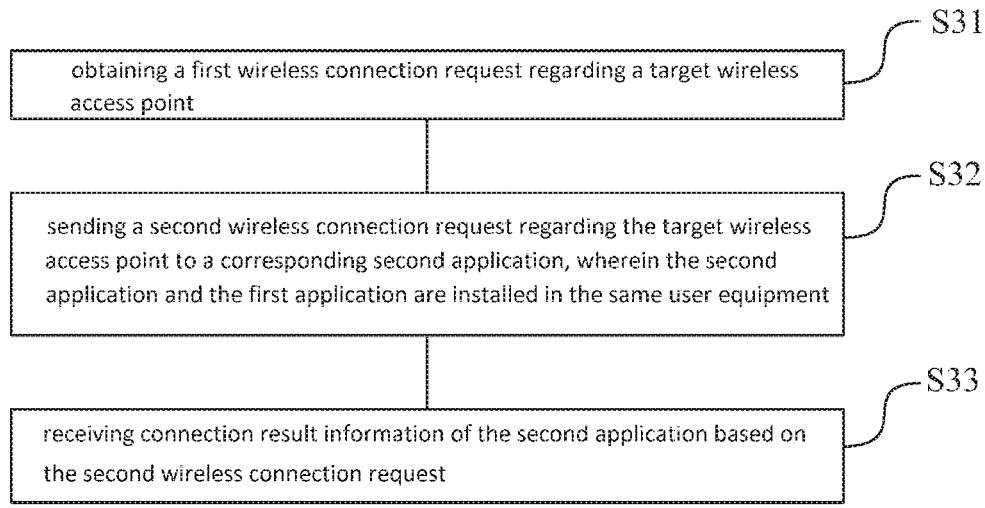
FIG. 3 shows a flowchart of a method for connecting a wireless access point through a first application in a user equipment according to a further embodiment of the present application.

FIG. 3 shows a flowchart of a method for connecting a wireless access point through a first application in a user equipment according to another aspect of the present application, wherein the method includes step S31, step S32 and step S33.

In step S31, the first application obtains a first wireless connection request regarding a target wireless access point. In step S32, the first application sends a second wireless connection request regarding the target wireless access point to a corresponding second application, wherein the second application and the first application are installed in the same user equipment. In step S33, the first application receives connection result information of the second application regarding the second wireless connection request.

In particular, in step S31, the first application obtains a first wireless connection request regarding a target wireless access point. For example, the user desires to connect the user equipment to the target wireless access point, for example, by designating the SSID/BSSID of the target wireless access point and sending the first wireless connection request regarding the target wireless access point to the first application.

In step S32, the first application sends a second wireless connection request regarding the target wireless access point to a corresponding second application, wherein the second application and the first application are installed in the same user equipment. The second wireless connection request corresponds to the previously-mentioned first wireless connection request. At this point, the first application does not send the wireless connection request directly to the system of the user equipment. The first application and the system of the user equipment are independent, so that the developers of the first application merely have to focus on the communication between the first application and the second application regardless of the specific platform for developing the first application, rather than focusing on the compatibility between the first application and different systems of the user equipment.

In step S33, the first application receives connection result information of the second application regarding the second wireless connection request. For example, the first application receives information such as successful connection, failed connection, connection bandwidth information, connection stability information, etc. returned after sending the second wireless connection request. In one embodiment, communication is implemented through the wireless connection between the user equipment and the target wireless access point if the connection result information includes information of successful connection. At this point, since the wireless connection between the user equipment and the target wireless access point is established, the communication between the user equipment and the target wireless access point is implemented without the interface provided by the second application.

In one embodiment, the first application sends a scanning request to the second application for scanning wireless access points surrounding the user equipment (the signal of which cover the user equipment), and receives one or more wireless access points returned by the second application based on the scanning request, e.g., the SSID/BSSID information and/or wireless signal strength, etc. of the one or more wireless access points. The first application does not send the wireless access point scanning request directly to the system of the user equipment. The first application and the system of the user equipment are independent, so that the developers of the first application merely have to focus on the communication between the first application and the second application regardless of the specific platform for developing the first application, rather than focusing on the compatibility between the first application and different systems of the user equipment.

Further In one embodiment, the first application obtains the first wireless connection request regarding the target wireless access point, wherein the target wireless access point is selected from the one or more wireless access points returned by the second application. The selection may be performed by user, or by the first application according to pre-set logic (e.g., a wireless access point with the strongest signal strength is selected).

More In one embodiment, to facilitate the user selecting the target wireless access point from the one or more wireless access points returned by the second application based on the scanning request sent by the first application, presenting at least one wireless access point of the one or more wireless access points in the first application. For example, the wireless access points returned are all presented in a list on the screen of the user equipment. The returned wireless access points may be ranked and presented (for example, according to the signal strength). Or only the qualified one or more wireless access points are presented which are filtered according to pre-set logic. Then the first wireless connection request regarding the target wireless access point is generated according to the target wireless access point selected by the user from the at least one presented wireless access points.

Figure 4:
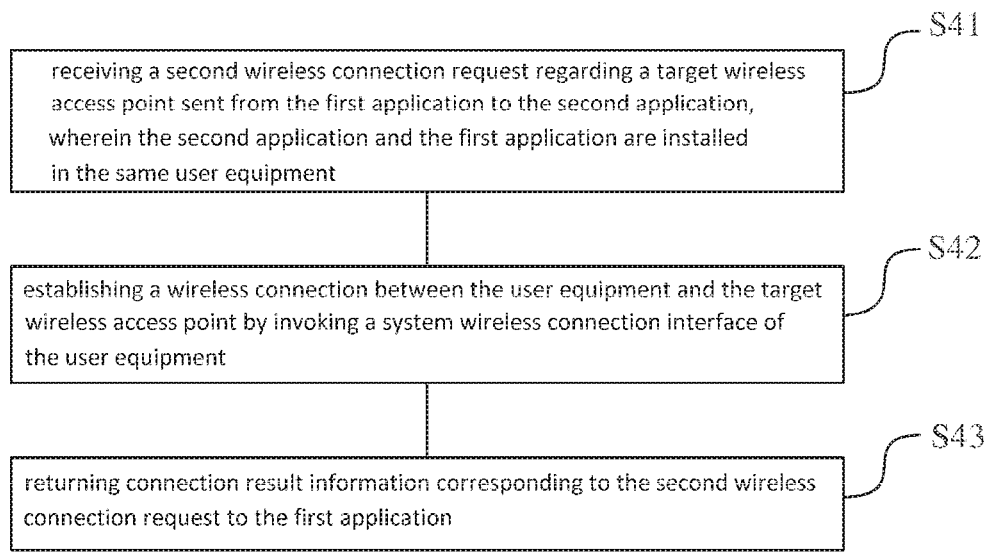
FIG. 4 shows a flowchart of a method for connecting a wireless access point through a second application in a user equipment according to a further embodiment of the present application.

FIG. 4 shows a flowchart of a method for connecting a wireless access point through a second application in a user equipment according to a further aspect of the present application, wherein the method includes step S41, step S42 and step S43.

In step S41, receiving a second wireless connection request regarding a target wireless access point sent from the first application to the second application, wherein the second application and the first application are installed in the same user equipment. In step S42, the second application establishes a wireless connection between the user equipment and the target wireless access point by invoking the system wireless connection interface of the user equipment. In step S43, the second application returns connection result information corresponding to the second wireless connection request to the first application.

In particular, in step S41, receiving a second wireless connection request regarding a target wireless access point sent from the first application to the second application, wherein the second application and the first application are installed in the same user equipment. At this point, the first application does not send the wireless connection request directly to the system of the user equipment. The first application and the system of the user equipment are independent, so that the developers of the first application merely have to focus on the communication between the first application and the second application regardless of the specific platform for developing the first application, rather than focusing on the compatibility between the first application and different systems of the user equipment.

In step S42, the second application establishes a wireless connection between the user equipment and the target wireless access point by invoking the system wireless connection interface of the user equipment. The wireless connection interface is provided by the system of individual user equipment. The wireless connection between the user equipment and the previously-mentioned wireless access point can be implemented by invoking the interface of the individual user equipment.

In step S43, the second application returns connection result information corresponding to the second wireless connection request to the first application. For example, the first application receives information such as successful connection, failed connection, connection bandwidth information, connection stability information, etc. returned after sending the second wireless connection request. In one embodiment, the fourth apparatus 4 communicates through a wireless connection between the user equipment and the target wireless access point if the connection result information includes information of successful connection. At this point, since the wireless connection between the user equipment and the target wireless access point is established, the communication between the user equipment and the target wireless access point may be implemented without the interface provided by the second application.

In one embodiment, the first application sends a scanning request to the second application for scanning wireless access points surrounding the user equipment (the signal of which cover the user equipment), and obtains one or more wireless access points returned by the second application based on the scanning request, for example, the SSID/BSSID information and/or wireless signal strength, etc. of the one or more wireless access points. The first application does not send the wireless connection request directly to the system of the user equipment. The first application and the system of the user equipment are independent, so that the developers of the first application merely have to focus on the communication between the first application and the second application regardless of the specific platform for developing the first application, rather than focusing on the compatibility between the first application and different systems of the user equipment. At this point, a scan for the wireless access points surrounding the user equipment (the signal of which cover the user equipment) may be performed by invoking the wireless connection point scanning interface of the system of the user equipment, and one or more wireless access points are obtained which are returned by the second application based on the scanning request. Then at least one wireless access point of the one or more wireless access points is returned to the first application. For example, the wireless access points returned based on the scanning request may be ranked (for example, according to the signal strength) and then preferred wireless access points may be returned. Or at least one wireless access point of the one or more wireless access points may be filtered and returned according to pre-set logic.

Figure 5:
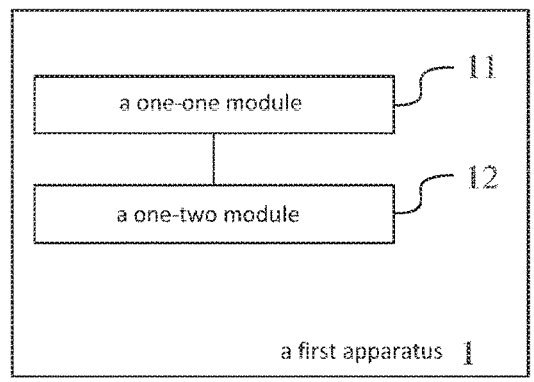
FIG. 5 shows a structural diagram of a first apparatus for connecting a wireless access point through a first application in a user equipment according to an embodiment of the present application.

FIG. 5 shows a structural diagram of an apparatus for connecting a wireless access point through a first application in a user equipment according to an aspect of the present application, wherein the first apparatus 1 includes a one-one module 11 and a one-two module 12.

The one-one module 11 obtains a first wireless connection request regarding a target wireless access point. The one-two module 12 sends a second wireless connection request regarding the target wireless access point to a corresponding second application by invoking a first interface provided by the second application, wherein the second application and the first application are installed in the same user equipment, and the first interface is independent from the system of the user equipment, and the second application invoke a wireless connection interface of the system to establish a wireless connection between the user equipment and the target wireless access point based on the second wireless connection request.

In particular, the one-one module 11 obtains a first wireless connection request regarding a target wireless access point. For example, the user desires to connect the user equipment to the target wireless access point, for example, by designating the SSID/BSSID of the target wireless access point and sending a first wireless connection request regarding the target wireless access point to the first application. The operation of designation may be implemented by manual input via the user equipment, or selection from the wireless access lists provided by the user equipment, etc.

The one-two module 12 then sends a second wireless connection request regarding the target wireless access point to a corresponding second application by invoking a first interface provided by the second application, wherein the second application and the first application are installed in the same user equipment, and the first interface is independent from the system of the user equipment, and the second application, based on the second wireless connection request, invokes a wireless connection interface of the system to establish a wireless connection between the user equipment and the target wireless access point. For example, the first application invokes a corresponding first interface provided by the second application, sends a second wireless connection request regarding the target wireless access point to the second application which corresponds to the first wireless connection request, wherein the first application and the second application are both installed in the same user equipment. Accordingly, the invocation of the first interface happens at the user equipment. The first interface is independent from the operating system of the user equipment, so that the first interface is independent from the programming interface provided by the operating system of the user equipment. The invocation of the first interface by the first application is also independent from the programming interface provided by the operating system of the user equipment, so that the developers of the first application merely have to focus on the interface provided by the second application to the first application regardless of specific development platform, rather than focusing on the system programming interface.

At this point, the second application invokes a wireless connection interface of the system to establish a wireless connection between the user equipment and the target wireless access point, wherein the wireless connection interface is provided by the system of the individual user equipment. A wireless connection between the user equipment and the target wireless access point may be implemented by invoking the interface of the individual user equipment.

In one embodiment, a one-three module 13 then receives connection result information of the second application regarding the second wireless connection request. For example, the one-three module 13 receives information such as successful connection, failed connection, connection bandwidth information, connection stability information, etc. returned after sending the second wireless connection request. In one embodiment, communication is achieved via a wireless connection between the user equipment and the target wireless access point if the connection result information includes information of successful connection. At this point, since a wireless connection between the user equipment and the target wireless access point is established, the communication between the user equipment and the target wireless access point may be implemented without the interface provided by the second application.

In one embodiment, the second application further provides a second interface independent from the system of the user equipment. A scanning request is sent to the second application by invoking the second interface for scanning wireless access points (the signal of which can cover the user equipment) surrounding the user equipment, and one or more wireless access points may be obtained which are returned by the second application based on the scanning request, for example, the SSID/BSSID information and/or wireless signal strength of the one or more wireless access points. Similar to the first interface, the second interface is independent from the operating system of the user equipment, so that the second interface is independent from the programming interface of the operating system of the user equipment. The invocation of the second interface by the first application is also independent from the programming interface of the operating system of the user equipment, so that the developers of the first application merely have to focus on the interface provided by the second application to the first application regardless of the specific developing platform, rather than focusing on the system programming interface.

In one embodiment, the one-one module 11 obtains a first wireless connection request regarding the target wireless access point, wherein the target wireless access point is selected from the one or more wireless access points returned by the second application. The selection may be performed by the user, or by the first application according to pre-set logic (e.g., selecting the wireless access point with the strongest signal strength). Further, referring to FIG. 9, before selecting the target wireless access point from the one or more wireless access points, authenticated status information of these wireless access points may be requested from corresponding network devices (e.g., cloud servers). For example, cloud servers store in advance information on some wireless access points and corresponding authenticated status information, for example, whether the wireless access point has corresponding authenticated information stored at the cloud server. Target wireless access point is selected from these one or more wireless access points according to the requested authenticated status information. For example, a wireless access point having corresponding authenticated information stored at the cloud server is selected as the target wireless access point from the multiple wireless access points, for connection in accordance with the authenticated information stored at the cloud server. A first wireless connection request is then obtained regarding the target wireless access point.

In one embodiment, to facilitate the user selecting the target wireless access point from the one or more wireless access points returned by the second application based on the scanning request sent by the first application via the second interface, presenting at least one wireless access point of the one or more wireless access points in the first application. For example, the wireless access points returned are all presented in a list on the screen of the user equipment. Or the wireless access points returned may be ranked (for example, according to the signal strength) and then be presented. Or only one or more qualified wireless access points that are filtered according to pre-set logic are presented. A first wireless connection request regarding the target wireless access point may be generated according to the target wireless access point selected from the presented at least one wireless access points by the user.

In one embodiment, the second application further provides a third interface independent from the system of the user equipment. An execution request may be sent from the second application by invoking the third interface. The execution request includes but is not limited to: obtaining interface elements from the second application, such as view components, layouts, etc., obtaining the location information of the user equipment from the second application, performing data storage in the user equipment through the second application, performing data communication through the second application. Accordingly, the third interface provided by the second application includes but is not limited to: an interface for obtaining interface elements from the second application, an interface for obtaining location information of the user equipment from the second application, an interface for performing data storage in the user equipment through the second application, and an interface for performing data communication through the second application. Similar to the first interface, the third interface is independent from the operating system of the user equipment, so that the third interface is independent from the programming interface of the operating system of the user equipment. The invocation of the third interface by the first application is also independent from the programming interface of the operating system of the user equipment, so that the developers of the first application merely have to focus on the interface provided by the second application to the first application regardless of the specific development platform, rather than focusing on the system programming interface.

Specifically, the first application is developed based on a script language (e.g., JavaScript, Lua, Python, Ruby, etc.). The second application has a corresponding built-in script engine. The first application can be interpreted and executed by invoking the script engine. After second application with identical script engine are developed on different platforms, first application which is developed based on corresponding script language and have practical functions may run across different platforms. The developers do not have to code for different system platforms, but rather focus on the interface provided by the second application. Applications that may run on different platforms are thus developed, which improves the development efficiency, shortens the development period, and reduces the development costs. In addition, the functional updates of the first application may be implemented on-line without the need of downloading and installation of a new release of the application. There is no need to inform the user of the update, which improves user experience. Meanwhile, there is no need to maintain multiple versions of the first application and thus further reduces the development costs.

Referring to FIG. 10, the first application is developed based on a script language. The second application has a corresponding built-in script engine. The first application can be interpreted and executed by invoking the script engine. The second application provides a first interface and a second interface independent from the system of the user equipment. A scanning request is sent to the second application by invoking the second interface for scanning wireless access points surrounding the user equipment (the signal of which cover the user equipment). The second application invokes the wireless connection point scanning interface of the system interface provided by the system of the user equipment to scan and obtain one or more wireless access points surrounding the user equipment and returns the one or more wireless access points to the second application. The second application then returns the one or more wireless access points based on the scanning request of the first application, for example, the SSID/BSSID information and/or wireless signal strength, etc. of the one or more wireless access points. The first application invokes the first interface provided by the second application to send a second wireless connection request regarding the target wireless access point and corresponding to the first wireless connection request to the second application. In one embodiment, the second application further provides a third interface independent from the system of the user equipment. The first application sends an execution request from the second application by invoking the third interface. The execution request includes but is not limited to: obtaining interface elements from the second application (e.g., view components, layouts, etc.), obtaining location information of the user equipment from the second application, performing data storage in the user equipment through the second application, performing data communication through the second application. Accordingly, the third interface provided by the second application includes but is not limited to: an interface for obtaining interface elements from the second application, an interface for obtaining location information of the user equipment from the second application, an interface for performing data storage in the user equipment through the second application, and an interface for performing data communication through the second application. Further, with further reference to FIG. 9, before selecting the target wireless access point, the first application obtains the authenticated information of these wireless access points from corresponding network devices (e.g., cloud servers). For example, the cloud servers store in advance information on some wireless access points and corresponding authenticated information. The target wireless access point is selected from these one or more wireless access points according to the authenticated information. Then a first wireless connection request is obtained regarding the target wireless access point.

The first application and the second application are both installed in the same user equipment. Accordingly, the invocation of the first interface happens at the user equipment. In addition, the first interface, the second interface and the third interface are independent from the operating system of the user equipment, so that the first interface, the second interface and the third interface are independent from the programming interface provided by the operating system of the user equipment. The invocation of the first interface by the first application is independent from the programming interface provided by the operating system of the user equipment, so that the developers of the first application merely have to focus on the interface provided by the second application to the first application regardless of the specific development platform, rather than focusing on the system programming interface.

Figure 6:
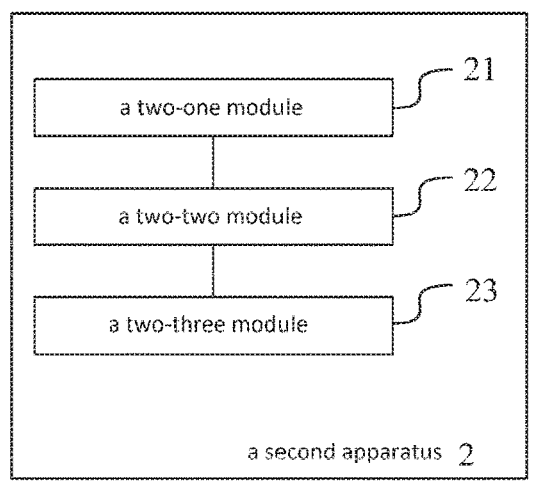
FIG. 6 shows a structural diagram of a second apparatus for connecting a wireless access point through a second application in a user equipment according to another embodiment of the present application.

FIG. 6 shows a structural diagram of an apparatus for connecting a wireless access point through a second application in a user equipment according to another aspect of the present application, wherein the second apparatus 2 includes a two-one module 21, a two-two module 22 and a two-three module 23.

The two-one module 21 receives a second wireless connection request regarding a target wireless access point sent from a first application to the second application by invoking a first interface provided by the second application, wherein the second application and the first application are installed in the same user equipment, and the first interface is independent from the system of the user equipment. The two-two module 22 establishes a wireless connection between the user equipment and the target wireless access point by invoking a wireless connection interface of the system. The two-three module 23 returns connection result information corresponding to the second wireless connection request to the first application.

In particular, the two-one module 21 receives a second wireless connection request regarding a target wireless access point sent from a first application to the second application by invoking a first interface provided by the second application, wherein the second application and the first application are installed in the same user equipment, and the first interface is independent from the system of the user equipment. For example, the first application invokes a corresponding first interface provided by the second application to send a second wireless connection request regarding the target wireless access point and corresponding to the first wireless connection request to the second application. The first application and the second application are both installed in the same user equipment. Accordingly, the invocation of the first interface happens at the user equipment. In addition, the first interface is independent from the operating system of the user equipment, so that the first interface is independent from the programming interface of the operating system of the user equipment. The invocation of the first interface by the first application is also independent from the programming interface of the operating system of the user equipment, so that the developers of the first application merely have to focus on the interface provided by the second application to the first application regardless of the specific development platform, rather than focusing on the system programming interface.

The two-two module 22 then establishes a wireless connection between the user equipment and the target wireless access point by invoking a wireless connection interface of the system. The wireless connection interface is provided by system of individual user equipment. A wireless connection between the user equipment and the target wireless access point is implemented by invoking the interface of the individual user equipment.

The two-three module 23 returns connection result information corresponding to the second wireless connection request to the first application. For example, the two-three module 23 receives information such as successful connection, failed connection, connection bandwidth information, connection stability information, etc. returned after sending the second wireless connection request. In one embodiment, the first apparatus 1 communicates via a wireless connection between the user equipment and the target wireless access point if the connection result information includes information of successful connection. At this point, since a wireless connection between the user equipment and the wireless access point is established, the communication between the user equipment and the target wireless access point may be implemented without the interface provided by the second application.

In one embodiment, the second application further provides a second interface independent from the system of the user equipment. A scanning request is sent to the second application by invoking the second interface by the first application for scanning wireless access points (the signal of which can cover the user equipment) surrounding the user equipment and one or more wireless access points may be obtained which are returned by the second application based on the scanning request, for example, the SSID/BSSID information and/or wireless signal strength, etc. of the one or more wireless access points. Similar to the first interface, the second interface is independent from the operating system of the user equipment, so that the second interface is independent from the programming interface of the operating system of the user equipment. The invocation of the second interface by the first application is also independent from the programming interface of the operating system of the user equipment, so that the developers of the first application merely have to focus on the interface provided by the second application to the first application regardless of the specific developing platform, rather than focusing on the system programming interface. At this point, a scan for wireless access points surrounding the user equipment (the signal of which cover the user equipment) is performed by invoking the wireless connection point scanning interface of the system of the user equipment, and one or more wireless access points are returned by the second application based on the scanning request. Then at least one wireless access point of the one or more wireless access points may be returned to the first application. For example, the wireless access points returned based on the scanning request may be ranked, for example, according to the signal strength and then preferred wireless access points may be returned. Or at least one wireless access point of the one or more wireless access points may be filtered and returned according to other pre-set logic.

Figure 7:
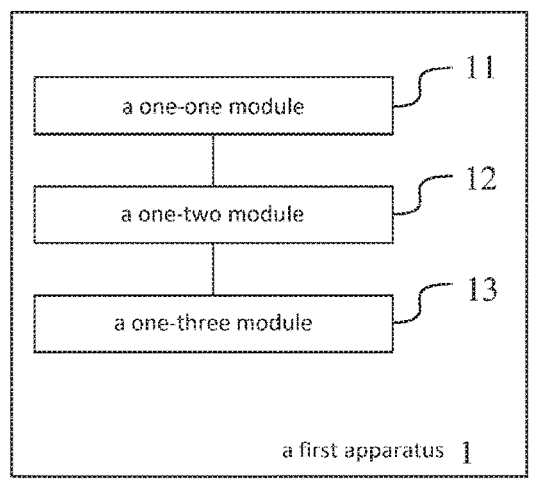
FIG. 7 shows a structural diagram of a first apparatus for connecting a wireless access point through a first application in a user equipment according to a further embodiment of the present application.

FIG. 7 shows a structural diagram of an apparatus for connecting a wireless access point through a first application in a user equipment according to a further aspect of the present application, wherein the first apparatus 1 includes a one-one module 11, a one-two module 12 and a one-three module 13.

The one-one module 11 obtains a first wireless connection request regarding a target wireless access point. The one-two module 12 sends a second wireless connection request regarding the target wireless access point to a corresponding second application, wherein the second application and the first application are installed in the same user equipment. The one-three module 13 receives connection result information of the second application regarding the second wireless connection request.

In particular, the one-one module 11 obtains a first wireless connection request regarding a target wireless access point. For example, the user desires to connect the user equipment to the target wireless access point, for example, by designating the SSID/BSSID of the target wireless access point and sending the first wireless connection request regarding the target wireless access point to the first application.

The one-two module 12 sends a second wireless connection request regarding the target wireless access point to a corresponding second application, wherein the second application and the first application are installed in the same user equipment. The second wireless connection request corresponds to the previously-mentioned first wireless connection request. At this point, the first application does not send the wireless connection request directly to the system of the user equipment. The first application and the system of the user equipment are independent, so that the developers of the first application merely have to focus on the communication between the first application and the second application regardless of the specific platform for developing the first application, rather than focusing on the compatibility between the first application and different systems of the user equipment.

The one-three module 13 receives connection result information of the second application regarding the second wireless connection request. For example, the one-three module 13 receives information such as successful connection, failed connection, connection bandwidth information, connection stability information, etc. returned after sending the second wireless connection request. In one embodiment, communication is implemented through the wireless connection between the user equipment and the target wireless access point if the connection result information includes information of successful connection. At this point, since the wireless connection between the user equipment and the target wireless access point is established, the communication between the user equipment and the target wireless access point may be implemented without the interface provided by the second application.

In one embodiment, the first apparatus 1 sends a scanning request to the second application for scanning wireless access points surrounding the user equipment (the signal of which cover the user equipment) and receives one or more wireless access points returned by the second application based on the scanning request, e.g., the SSID/BSSID information and/or wireless signal strength, etc. of the one or more wireless access points. The first application does not send the wireless access point scanning request directly to the system of the user equipment. The first application and the system of the user equipment are independent, so that the developers of the first application merely have to focus on the communication between the first application and the second application regardless of the specific platform for developing the first application, rather than focusing on the compatibility between the first application and different systems of the user equipment.

Further In one embodiment, the first apparatus 1 obtains the first wireless connection request regarding the target wireless access point, wherein the target wireless access point is selected from the one or more wireless access points returned by the second application. The selection is performed by user, or by the first application according to pre-set logic, (e.g., a wireless access point with the strongest signal strength is selected).

More In one embodiment, to facilitate the user selecting the target wireless access point from the one or more wireless access points returned by the second application based on the scanning request sent by the first application, presenting at least one wireless access point of the one or more wireless access points in the first application. For example, the wireless access points returned are all presented in a list on the screen of the user equipment. The returned wireless access points may be ranked and presented (for example, according to the signal strength). Or only the qualified one or more wireless access points are presented which are filtered according to pre-set logic. Then the first wireless connection request regarding the target wireless access point is generated according to the target wireless access point selected by the user from the at least one presented wireless access points.

Figure 8:
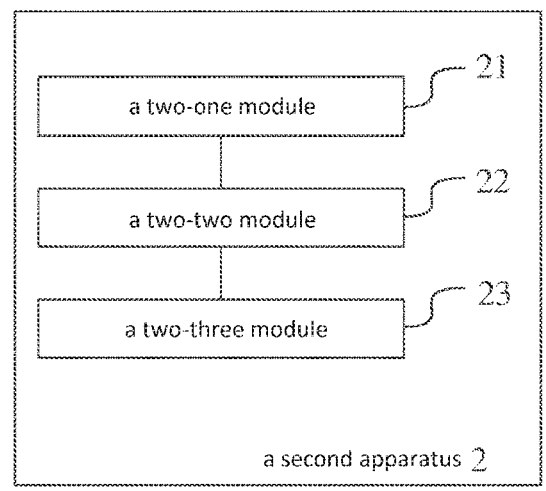
FIG. 8 shows a structural diagram of a second apparatus for connecting a wireless access point through a second application in a user equipment according to a further embodiment of the present application.

FIG. 8 shows a structural diagram of an apparatus for connecting a wireless access point through a second application in a user equipment according to a further aspect of the present application, wherein the second apparatus 2 includes a two-one module 21, a two-two module 22 and a two-three module 23.

The two-one module 21 receives a second wireless connection request regarding a target wireless access point sent from the first application to the second application, wherein the second application and the first application are installed in the same user equipment. The two-two module 22 establishes a wireless connection between the user equipment and the target wireless access point by invoking the system wireless connection interface of the user equipment. The two-three module 23 returns connection result information corresponding to the second wireless connection request to the first application.

In particular, the two-one module 21 receives a second wireless connection request regarding a target wireless access point sent from the first application to the second application, wherein the second application and the first application are installed in the same user equipment. At this point, the first application does not send the wireless connection request directly to the system of the user equipment. The first application and the system of the user equipment are independent, so that the developers of the first application merely have to focus on the communication between the first application and the second application regardless of the specific platform for developing the first application, rather than focusing on the compatibility between the first application and different systems of the user equipment.

The two-two module 22 establishes a wireless connection between the user equipment and the target wireless access point by invoking the system wireless connection interface of the user equipment. The wireless connection interface is provided by the system of individual user equipment. The wireless connection between the user equipment and the previously-mentioned wireless access point can be implemented by invoking the interface of the individual user equipment.

The two-three module 23 returns connection result information corresponding to the second wireless connection request to the first application. For example, the two-three module 23 receives information such as successful connection, failed connection, connection bandwidth information, connection stability information, etc. returned after sending the second wireless connection request. In one embodiment, the second apparatus 2 communicates through a wireless connection between the user equipment and the target wireless access point if the connection result information includes information of successful connection. At this point, since the wireless connection between the user equipment and the target wireless access point is established, the communication between the user equipment and the target wireless access point may be implemented without the interface provided by the second application.

In one embodiment, the first application sends a scanning request to the second application for scanning wireless access points surrounding the user equipment (the signal of which cover the user equipment) and obtains one or more wireless access points returned by the second application based on the scanning request, e.g., the SSID/BSSID information and/or wireless signal strength, etc. of the one or more wireless access points. The first application does not send the wireless connection request directly to the system of the user equipment. The first application and the system of the user equipment are independent, so that the developers of the first application merely have to focus on the communication between the first application and the second application regardless of the specific platform for developing the first application, rather than focusing on the compatibility between the first application and different systems of the user equipment. At this point, a scan for the wireless access points surrounding the user equipment (the signal of which cover the user equipment) may be performed by invoking the wireless connection point scanning interface of the system of the user equipment, and one or more wireless access points are obtained which are returned by the second application based on the scanning request. Then at least one wireless access point of the one or more wireless access points is returned to the first application. For example, the wireless access points returned based on the scanning request may be ranked (for example, according to the signal strength) and then preferred wireless access points may be returned. Or at least one wireless access point of the one or more wireless access points may be filtered and returned according to pre-set logic.

According to an aspect of the present application, it is provided a device for connecting a wireless access point through a first application in a user equipment, the device comprising:
 a processor; and
 a memory configured to store computer executable instructions, when executed, cause the processor to:
 obtain a first wireless connection request regarding a target wireless access point;
 send a second wireless connection request regarding the target wireless access point to a corresponding second application by invoking a first interface provided by the second application, wherein the second application and the first application are installed in the same user equipment, and the first interface is independent from the system of the user equipment, and the second application, based on the second wireless connection request, invokes a wireless connection interface of the system to establish a wireless connection between the user equipment and the target wireless access point.

According to a another aspect of the present application, it is provided a device for connecting a wireless access point through a second application in a user equipment, the device comprising:
- a processor; and
- a memory configured to store computer executable instructions, when executed, cause the processor to:
- receive a second wireless connection request regarding a target wireless access point sent from a first application to the second application by invoking a first interface provided by the second application, wherein the second application and the first application are installed in the same user equipment, and the first interface is independent from the system of the user equipment;
- establish a wireless connection between the user equipment and the target wireless access point by invoking a wireless connection interface of the system;
- return connection result information corresponding to the second wireless connection request to the first application.

According to a further aspect of the present application, it is provided a device for connecting a wireless access point through a first application in a user equipment, the device comprising:
- a processor; and
- a memory configured to store computer executable instructions, when executed, cause the processor to:
- obtain a first wireless connection request regarding a target wireless access point;
- send a second wireless connection request regarding the target wireless access point to a corresponding second application, wherein the second application and the first application are installed in the same user equipment;
- receive connection result information of the second application regarding the second wireless connection request.

According to a further aspect of the present application, it is provided a device for connecting a wireless access point through a second application in a user equipment, the device comprising:
- a processor; and
- a memory configured to store computer executable instructions, when executed, cause the processor to:
- receive a second wireless connection request regarding a target wireless access point sent from a first application to the second application, wherein the second application and the first application are installed in the same user equipment;
- establish a wireless connection between the user equipment and the target wireless access point by invoking the system wireless connection interface of the user equipment;
- return connection result information corresponding to the second wireless connection request to the first application.

According to an aspect of the present application, it is provided a computer readable storage medium including instructions, when executed, cause a system to:
- obtain a first wireless connection request regarding a target wireless access point;
- send a second wireless connection request regarding the target wireless access point to a corresponding second application by invoking a first interface provided by the second application, wherein the second application and the first application are installed in a same user equipment, and the first interface is independent from the system of the user equipment, and the second application, based on the second wireless connection request, invokes a wireless connection interface of the system to establish a wireless connection between the user equipment and the target wireless access point.

According to another aspect of the present application, it is provided a computer readable storage medium including instructions, when executed, cause a system to:
- receive a second wireless connection request regarding a target wireless access point sent from a first application to a second application by invoking a first interface provided by the second application, wherein the second application and the first application are installed in a same user equipment, and the first interface is independent from the system of the user equipment;
- establish a wireless connection between the user equipment and the target wireless access point by invoking a wireless connection interface of the system;
- return connection result information corresponding to the second wireless connection request to the first application.

According to a further aspect of the present application, it is provided a computer readable storage medium including instructions, when executed, cause a system to:
- obtain a first wireless connection request regarding a target wireless access point;
- send a second wireless connection request regarding the target wireless access point to a corresponding second application, wherein the second application and the application are installed in a same user equipment;
- receive connection result information of the second application regarding the second wireless connection request.

According to a further aspect of the present application, it is provided a computer readable storage medium including instructions, when executed, cause a system to:
- receive a second wireless connection request regarding a target wireless access point sent from a first application to a second application, wherein the second application and the first application are installed in a same user equipment;
- establish a wireless connection between the user equipment and the target wireless access point by invoking the system wireless connection interface of the user equipment;
- return connection result information corresponding to the second wireless connection request to the first application.

It should to be noted that the present application may be implemented in software and/or a combination of software and hardware, for example, an application-specific integrated circuit (ASIC), a general-purpose computer or any other similar hardware devices may be used for implementation. In one embodiment, the software program of the present application may be executed by a processor to implement the steps or functions as described above. Likewise, the software program (comprising related data structures) of the present application may be stored in a computer readable recording medium, such as an RAM memory, a magnetic or optical driver or a floppy disk and similar devices. In addition, some steps or functions in the present application may be implemented by means of hardware, for example, as a circuit in cooperation with a processor to execute various steps or functions.

Moreover, a part of the present application may be embodied as a computer program product, for example, computer program instructions that, when executed by a computer, can call or provide a method and/or a technical solution according to the present application by means of the operations of the computer. The program instructions which call the method of the present application may be stored in a solid or removable recording medium, and/or transmitted by means of broadcast or data streams in other signal bearing medium, and/or stored in a working memory of a computer device which runs according to the program instructions. Here, one embodiment of the present application comprises an apparatus, the apparatus comprising a memory for storing computer program instructions and a processor for executing the program instructions, wherein when the computer program instructions are executed by the processor, the apparatus is triggered to run a method and/or a technical solution based on a plurality of aforementioned embodiments according to the present application.

For those skilled in the art, it is apparent that the present application is not limited to the details of the above-mentioned exemplary embodiments, and the present application can be implemented in other specific forms without departing the spirit or basic features of the present application. Therefore, no matter from which point of view, the embodiments should all be considered as exemplary and non-limiting. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the apparatus claims may also be implemented by one unit or means by means of software or hardware. The terms first and second and the like are used to represent names and do not represent any particular order.

The invention claimed is:

1. A method for connecting a wireless access point through a first application in a user equipment, comprising:
   obtaining a first wireless connection request regarding a target wireless access point; and
   sending a second wireless connection request regarding the target wireless access point to a corresponding second application by invoking a first interface provided by the second application, wherein the second application and the first application are installed in the same user equipment and do not include a system of a user equipment, the first application is based on a script language which is not specific to the system of the user equipment, and the first interface is independent from the system of the user equipment, and the second application, based on the second wireless connection request, invokes a wireless connection interface of the system to establish a wireless connection between the user equipment and the target wireless access point.

2. The method as recited in claim 1, further comprising:
   receiving connection result information of the second application regarding the second wireless connection request; and
   communicating through the wireless connection between the user equipment and the target wireless access point if the connection result information includes information of successful connection.

3. The method as recited in claim 1, further comprising:
   sending a scanning request for scanning wireless access points surrounding the user equipment to the second application by invoking a second interface provided by the second application, wherein the second interface is independent from the system; and
   receiving one or more wireless access points returned by the second application based on the scanning request.

4. The method as recited in claim 3, the step of obtaining a first wireless connection request regarding a target wireless access point comprising:
   obtaining a first wireless connection request regarding the target wireless access point, wherein the target wireless access point is selected from the one or more wireless access points.

5. The method as recited in claim 4, further comprising:
   obtaining authenticated status information on the wireless access point by requesting from corresponding network devices;
   wherein the step of obtaining a first wireless connection request regarding a target wireless access point comprising:
   selecting the target wireless access point from the one or more wireless access points according to the authenticated status information; and
   obtaining the first wireless connection request regarding the target wireless access point.

6. The method as recited in claim 4, further comprising:
   presenting at least one wireless access point of the one or more wireless access points in the first application;
   wherein the step of obtaining a first wireless connection request regarding a target wireless access point comprising:
   generating the first wireless connection request regarding the target wireless access point according to the target wireless access point selected from the at least one wireless access point by the user.

7. The method as recited in claim 1, further comprising:
   sending an execution request from the second application by invoking a third interface provided by the second application, wherein the third interface is independent from the system.

8. The method as recited in claim 7, wherein the third interface comprises at least one of:
   an interface for obtaining interface elements from the second application;
   an interface for obtaining location information of the user equipment from the second application;
   an interface for performing data storage in the user equipment through the second application; and
   an interface for performing data communication through the second application.

9. The method as recited in claim 1, wherein the first application is based on a script language and is interpreted and executed by invoking a script engine in the second application.

10. A method for connecting a wireless access point through a second application in a user equipment, comprising:
    receiving a second wireless connection request regarding a target wireless access point sent from a first application to the second application by invoking a first interface provided by the second application, wherein the second application and the first application are installed in the same user equipment and do not include a system of a user equipment, the first application is based on a script language which is not specific to the system of the user equipment, and the first interface is independent from the system of the user equipment;

establishing a wireless connection between the user equipment and the target wireless access point by invoking a wireless connection interface of the system; and returning connection result information corresponding to the second wireless connection request to the first application.

11. The method as recited in claim 10, further comprising:

receiving a scanning request for scanning wireless access points surrounding the user equipment sent from the first application to the second application by invoking a second interface provided by the second application, wherein the second interface is independent from the system;

obtaining one or more wireless access points surrounding the user equipment by invoking a wireless connection point scanning interface of the system; and returning at least one wireless access point of the one or more wireless access points to the first application.

12. An apparatus, comprising:

a processor; and a memory configured to store computer executable instructions, when executed, cause the processor to:

obtain a first wireless connection request regarding a target wireless access point; and send a second wireless connection request regarding the target wireless access point to a corresponding second application by invoking a first interface provided by the second application, wherein the second application and a first application are installed in the same user equipment and do not include a system of a user equipment, the first application is based on a script language which is not specific to the system of the user equipment, and the first interface is independent from the system of the user equipment, and the second application, based on the second wireless connection request, invokes a wireless connection interface of the system to establish a wireless connection between the user equipment and the target wireless access point.

* * * * *